United States Patent
Guan et al.

(10) Patent No.: US 12,124,709 B2
(45) Date of Patent: Oct. 22, 2024

(54) COMPUTING SYSTEM AND ASSOCIATED METHOD

(71) Applicant: ALIBABA (CHINA) CO., LTD., Zhejiang Province (CN)

(72) Inventors: Tianchan Guan, Shanghai (CN); Yijin Guan, Beijing (CN); Dimin Niu, San Mateo, CA (US); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 101 days.

(21) Appl. No.: 18/064,451

(22) Filed: Dec. 12, 2022

(65) Prior Publication Data

US 2024/0069754 A1 Feb. 29, 2024

(30) Foreign Application Priority Data

Aug. 31, 2022 (CN) .............................. 202211060067

(51) Int. Cl.
*G06F 3/06* (2006.01)
*G06F 13/42* (2006.01)

(52) U.S. Cl.
CPC .......... *G06F 3/0622* (2013.01); *G06F 3/0607* (2013.01); *G06F 3/0631* (2013.01); *G06F 3/0683* (2013.01); *G06F 13/4234* (2013.01)

(58) Field of Classification Search
CPC ..... G06F 3/0607; G06F 3/0631; G06F 3/0683
See application file for complete search history.

(56) References Cited

U.S. PATENT DOCUMENTS

| | | | | |
|---|---|---|---|---|
| 11,573,718 | B2* | 2/2023 | Wang | G06F 3/0619 |
| 11,620,233 | B1* | 4/2023 | Habusha | G06F 12/0891 |
| | | | | 711/207 |
| 11,983,436 | B2* | 5/2024 | Moon | G06F 3/0679 |
| 2010/0050241 | A1* | 2/2010 | Yan | H04L 63/104 |
| | | | | 726/5 |
| 2015/0039933 | A1* | 2/2015 | Chen | G06F 3/0673 |
| | | | | 711/148 |
| 2023/0176769 | A1* | 6/2023 | Shalom | G06F 3/0673 |
| 2023/0385190 | A1* | 11/2023 | Yuan | G06F 15/17331 |
| 2024/0020060 | A1* | 1/2024 | Hahn | G06F 3/0604 |
| 2024/0069954 | A1* | 2/2024 | Guan | G06F 9/45558 |

* cited by examiner

*Primary Examiner* — Henry Tsai
*Assistant Examiner* — Christopher A Daley
(74) *Attorney, Agent, or Firm* — WPAT, P.C.; Anthony King

(57) ABSTRACT

The present application discloses a computing system and an associated method. The computing system includes a first host, a second host, a first memory extension device and a second memory extension device. The first host includes a first memory, and the second host includes a second memory. The first host has a plurality of first memory addresses corresponding to a plurality of memory spaces of the first memory, and a plurality of second memory addresses corresponding to a plurality of memory spaces of the second memory. The first memory extension device is coupled to the first host. The second memory extension device is coupled to the second host and the first memory extension device. The first host accesses the plurality of memory spaces of the second memory through the first memory extension device and the second memory extension device.

19 Claims, 7 Drawing Sheets

COMPUTING SYSTEM AND ASSOCIATED METHOD

CROSS-REFERENCE TO RELATED APPLICATIONS

This application claims priority of China application No. 202211060067.5, filed on Aug. 31, 2022, which is incorporated by reference in its entirety.

BACKGROUND OF THE PRESENT DISCLOSURE

Field of the Present Disclosure

The present disclosure relates to a computing system and, more particularly, to a computing system that allows memory sharing among multiple hosts.

Description of the Prior Art

A cloud computing system may include multiple servers, each of which may include multiple processing units and a memory to be shared among the multiple processing units. When a cloud computing system receives a computing task from a user, the cloud computing system configures one or more processing units and part of the memory into a virtual machine for processing the task according to requirements of the task. In general, a cloud computing system maximizes as much as possible a hardware utilization rate of each server. However, due to different hardware resources needed for individual tasks, the configuration of hardware frequently suffers from restriction, such that the hardware utilization rate of servers may not be effectively improved. For example, if a task requires a larger memory space, than even though there are processing units in the server that are not configured yet, those processing unit may have to remain idle and cannot be configured into virtual machines due to the lack of configurable memory space. In contrast, if a task requires a larger number of processing units and has a lower demand on a memory space, there may be an insufficient number of configurable processing units, causing the remaining configurable memory space to idle. Therefore, there is a need for a solution that provides hardware resource allocation of a computing system with better flexibilities so as to improve the hardware utilization rate.

SUMMARY OF THE PRESENT DISCLOSURE

One embodiment of the present disclosure discloses a computing system. The computing system includes a first host, a second host, a first memory extension device, and a second memory extension device. The first host includes a first memory, the first host having a plurality of first memory addresses corresponding to a plurality of memory spaces of the first memory, and a plurality of second memory addresses. The second host includes a second memory, wherein the plurality of second memory addresses of the first host correspond to a plurality of memory spaces of the second memory. The first memory extension device is coupled to the first host. The second memory extension device is coupled to the second host and the first memory extension device. The first host is configured to access the plurality of memory spaces of the second memory through the first memory extension device and the second memory extension device.

Another embodiment of the present disclosure discloses a method for a computing system. The computing system includes a first host, a second host, a first memory extension device and a second memory extension device, the first host comprising a first memory, the second host comprising a second memory, the first memory extension device coupled to the first host, the second memory extension device coupled to the second host and the first memory extension device. The method includes having a plurality of first memory addresses of the first host correspond to a plurality of memory spaces of the first memory, having a plurality of second memory addresses of the first host correspond to a plurality of memory spaces of the second memory, and accessing, by the first host, the plurality of memory spaces of the second memory through the first memory extension device and the second memory extension device.

The computing system and an associated method of the present application allow multiple hosts to be coupled to one another through memory extension devices. Therefore, each host is able to access a memory of another host through a corresponding memory extension device, such that the computing system can more flexibly configure hardware resources to establish a virtual machine, thereby improving a hardware utilization rate of the computing system.

BRIEF DESCRIPTION OF THE DRAWINGS

Aspects of the present application can be better understood by reading the following embodiments in combination with the accompanying drawings below. It should be noted that, according to standard practice in industry, the various structures in the drawings are not drawn to scales. In fact, for description clarity, the sizes of the various structures may be increased or reduced as desired.

DETAILED DESCRIPTION OF THE EMBODIMENTS

Figure 1:
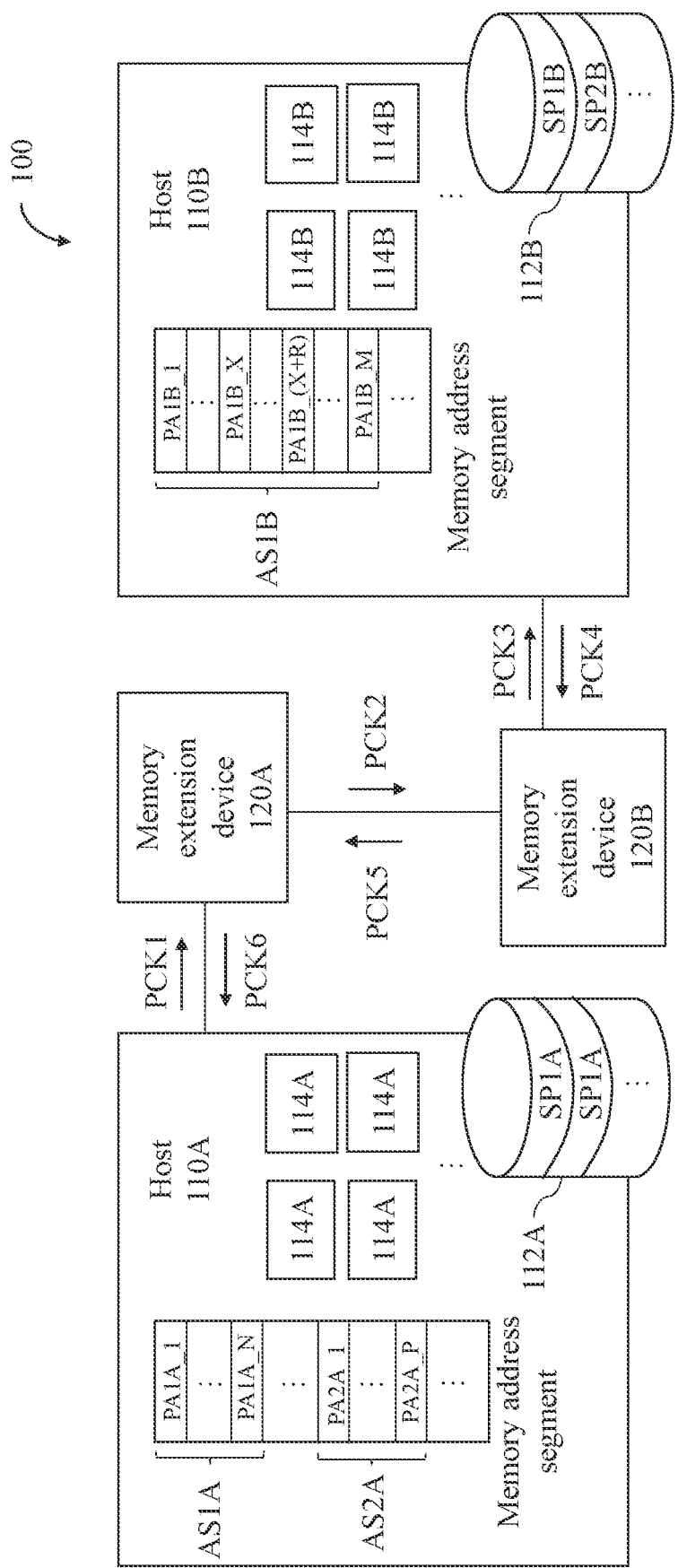
FIG. 1 is a schematic diagram of a computing system according to an embodiment of the present application.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 shows a schematic diagram of a computing system according to an embodiment of the present application. A computing system 100 includes a host 110A, a host 110B, a memory extension device 120A and a memory extension device 120B. As shown in FIG. 1, the memory extension device 120A may be coupled to the host 110A, and the memory extension device 120B may be coupled to the memory extension device 120A and the host 110B. Moreover, the host 110A may include a memory 112A and multiple processing units 114A, and the host 110B may include a memory 112B and multiple processing units 114B. The hosts 110A and 110B may be multi-core servers, wherein the processing units 114A and 114B therein may be computing cores for executing various software programs. In the present embodiment, in addition to accessing the memory 112A, the host 110A is able to access the memory 112B of the host 110B through the memory extension devices 120A and 120B. In such case, the host 110A can configure one or more processing units 114A therein and part of memory spaces in the memory 112B of the host 110B into one virtual machine to jointly perform a task.

For example, a physical address space of the host 110A may include multiple segments, wherein multiple physical addresses PA1A_1 to PA1A_N of a memory address segment AS1A may correspond to multiple memory spaces SP1A of the memory 112A. Thus, the processing unit 114A in the host 110A can access the corresponding memory space located in the memory 112A through the physical addresses PA1A_1 to PA1A_N, where N is an integer greater than 1. Similarly, multiple physical addresses PA1B_1 to PA1B_M of a memory address segment AS1B of the host 110B may correspond to multiple memory spaces SP1B of the memory 112B. Thus, the processing unit 114B in the host 110B can access the corresponding memory space located in the memory 112B through the physical addresses PA1B_1 to PA1B_M, where M is an integer greater than 1.

Moreover, during configuration of hardware resources of the hosts 110A and 110B, after the processing unit 114B and part of the memory spaces in the memory 112B in the host 110B are configured into a virtual machine, the memory 112B may still contain memory spaces remaining configurable. For example, in FIG. 1, in the memory address segment AS1B of the host 110B, the memory spaces SP2B corresponding to the physical addresses PA1B_X to PA1B_(X+R) may still be not yet configured, where X and R are integers greater than 1, and (X+R) is smaller than M. In such case, the computing system 100 can further enable the host 110A to setup another memory address segment AS2A, and, by performing address translation with the memory extension device 120A and the memory extension device 120B, physical addresses PA2A_1 to PA2A_P in the memory address segment AS2A can be corresponding to the physical addresses PA1B_X to PA1B_(X+R) of the memory 112B in the host 110B, where P is an integer greater than 1. In such case, the processing unit 114A in the host 110A is able to access multiple memory spaces SP2B corresponding to the physical addresses PA1B_X to PA1B_(X+R) in the memory 112B through the memory extension device 120A and the memory extension device 120B according to the physical addresses PA2A_1 to PA2A_P. As such, even when the configurable memory space in the memory 112A is insufficient, the computing system 100 can configure the idle processing unit 114A in the host 110A and multiple idle memory spaces SP2B in the memory 112B of the host 110B jointly into a virtual machine, thereby improving the hardware utilization rate of the computing system 100.

Figure 2:
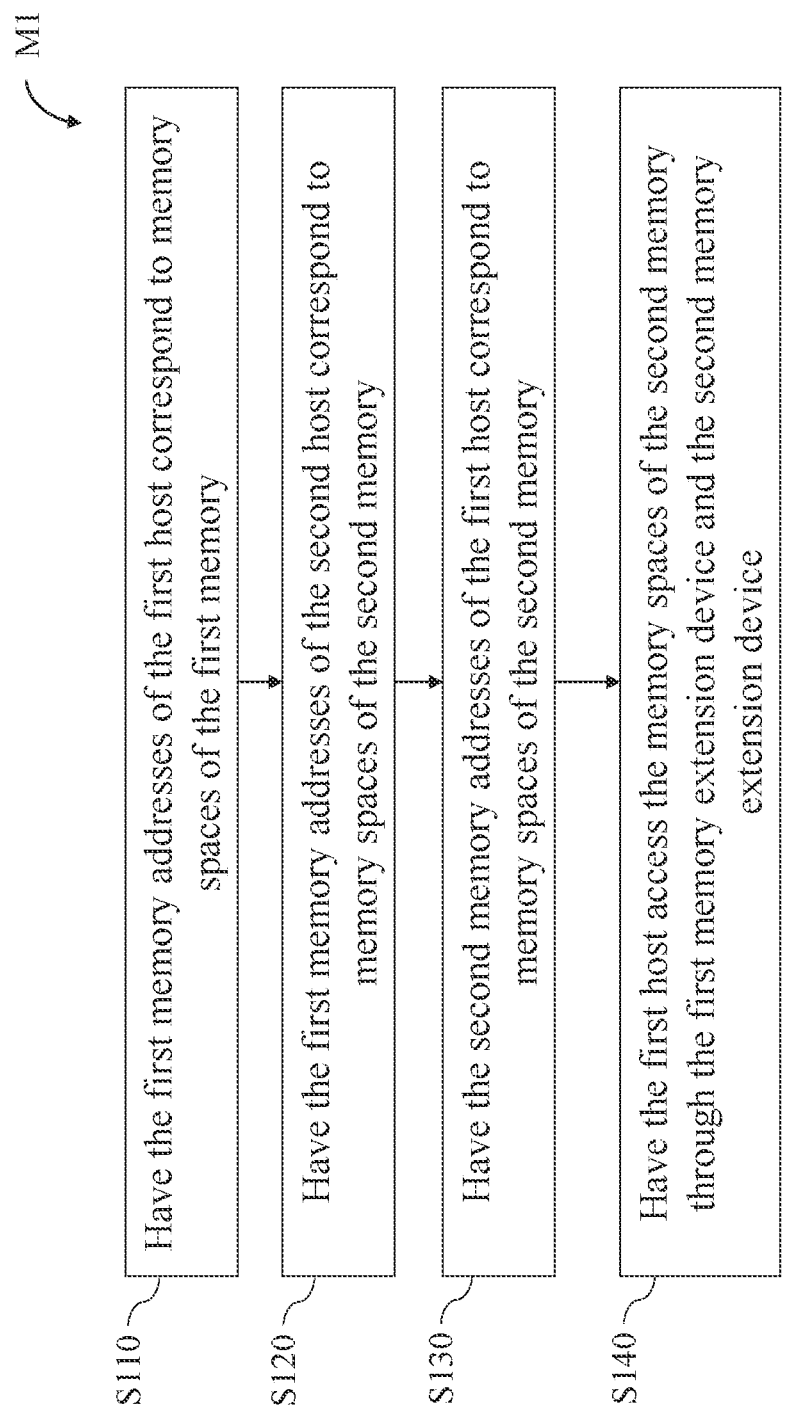
FIG. 2 is a schematic diagram of a method for a computing system according to an embodiment of the present application.

FIG. 2 shows a schematic diagram of a method for a computing system according to an embodiment of the present application. The method M1 for the computing system may include steps S110 to S140, and is applicable to the computing system 100. In some embodiments, upon receiving a computing task from a user, the computing system 100 can first configure hardware resources within the host 110A or the host 110B to establish corresponding virtual machines according to hardware requirements of the task. For example, in steps S110 and S120, the computing system 100 can first correspond the multiple physical addresses PA1A_1 to PA1A_N in the memory address segment AS1A of the host 110A to the memory spaces SP1A of the memory 112A for the processing unit 114A in the host 110A to access, and correspond the multiple physical addresses PA1B_1 to PA1B_M in the memory address segment AS1B of the host 110B to the memory spaces SP1B of the memory 112B for the processing unit 114B in the host 110B to access. Once the configuration in the individual hosts 110A and 110B is completed, if there are any idle processing unit 114A in the host 110A and idle memory spaces in the memory 112B of the host 110B, in step S130, the computing system 100 can correspond the multiple physical addresses PA2A_1 to PA2A_P of the second memory address segment AS2A of the host 110A to the idle memory spaces SP2B of the memory 112B. In such case, in addition to be jointly configured with the multiple memory spaces SP2A in the memory 112A, the idle processing unit 114A in the host 110A can also be jointly configured with the multiple memory spaces SP2B of the memory 112B. As such, after the computing system 100 configures the idle processing unit 114A in the host 110A and the memory spaces SP2B of the memory 112B jointly into a virtual machine, the host 110A is able to access the memory spaces SP2B of the memory 112B through the memory extension device 120A and the memory extension device 120B in step S140.

Moreover, in some embodiments, after the computing system 100 completes hardware configuration and establishes virtual machines in the hosts 110A and 110B, respectively, if there remain any idle processing unit 114B in the host 110B and any idle memory space in the memory 112A of the host 110A, the computing system 100 can also enable the host 110B to configure another memory address segment and correspond the addresses therein to the idle memory space of the memory 112A. In such case, the host 110B can also access the idle memory space of the memory 112A of the host 110A through the memory extension device 120A and the memory extension device 120B; that is to say, the idle processing unit 114B in the host 110B can also be configured jointly with the idle memory space of the memory 112A into a virtual machine.

Figure 3:
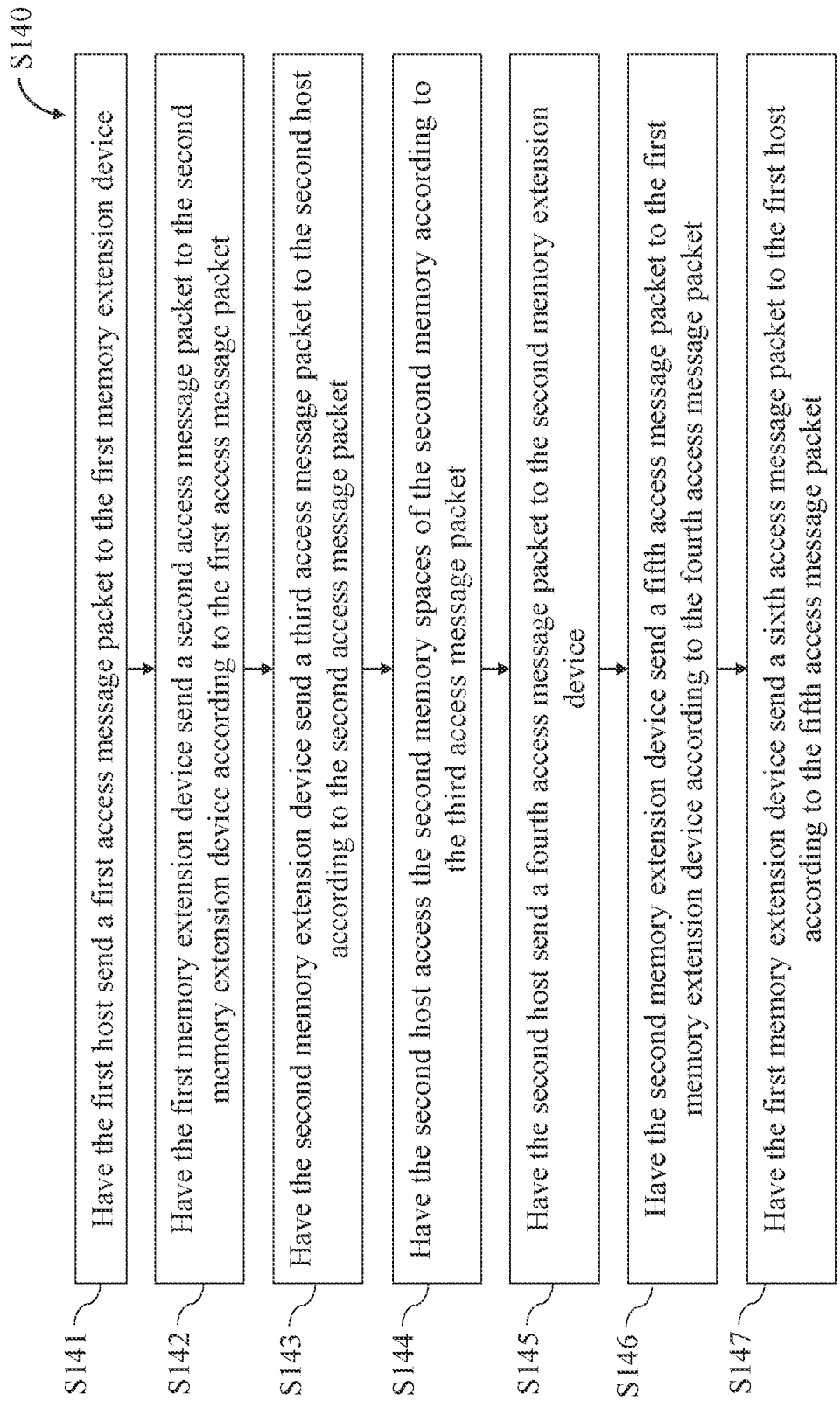
FIG. 3 is a flowchart of sub-steps of a host accessing a memory through a memory extension device.

FIG. 3 shows a flowchart of sub-steps of the host 110A accessing the memory space SP2B of the memory 112B through the memory extension device 120A and the memory extension device 120B. Referring to FIG. 1 and FIG. 3, in the present embodiment, the host 110A can send an access message packet PCK1 to the memory extension device 120A in step S141. Upon receiving the access message packet PCK1, the memory extension device 120A can send an access message packet PCK2 to the memory extension device 120B according to the access message packet PCK1 in step S142. Next, upon receiving the access message packet PCK2, the memory extension device 120B can send an access message packet PCK3 to the host 110B according to the access message packet PCK2 in step S143, and the host 110B is able to access the corresponding memory space SP2B in the memory 112B according to the content of the access message packet PCK3 in step S144, for example, performing a read operation or a write operation.

In the present embodiment, the host 110A and the memory extension device 120A can be connected by a Peripheral Component Interconnect express (PCIe) interface member, and the host 110B and the memory extension device 120B can also be connected by a PCIe interface member. Moreover, the host 110A and the memory extension device 120A can perform message transmission via a consistent interconnection protocol, and the host 110B and the memory extension device 120B can also perform message transmission via the same consistent interconnection protocol. In the present embodiment, the consistent interconnection protocol includes a first sub-protocol used when a host initiates a read/write operation to an external memory, and a second sub-protocol used when an external memory initiates a read/write operation to a host memory. For example, the consistent interconnection protocol may be, for example, the Compute Express Link (CXL) communication protocol, the first sub-protocol in the consistent interconnection protocol may be, for example, the CXL.mem protocol that allows a host to access a memory connected to a CXL apparatus (for example, the memory extension device 120A and the memory extension device 120B) by using a command, and the second sub-protocol in the consistent interconnection protocol may be, for example, the CXL.cache protocol that allows a CXL apparatus to request for access to a host memory. However, the present application does not limit that the CXL communication protocol is necessarily used. In some other embodiments, the consistent interconnection protocol may also be other types of interconnection protocols.

In the present embodiment, the host 110A can send the access message packet PCK1 to the memory extension device 120A according to the CXL.mem protocol, and the memory extension device 120B can send the access message packet PCK3 to the host 110B according to the CXL.cache protocol. Since packet formats required by the CXL.mem protocol and the CXL.cache protocol are different, the memory extension device 120B can perform format conversion on the access message packet PCK2 to generate the access message packet PCK3 compliant with a format specification of the CXL.cache protocol as shown in step S143 in FIG. 3. That is to say, data frames of the access message packet PK3 and/or efficient payload data thereof should comply with the specification of the CXL.cache protocol.

Moreover, as shown in FIG. 3, the host 110B is able to access the corresponding memory space SP2B in the memory 112B according to the access message packet PCK3 in step S144. For example, the host 110B can perform a read operation on the memory space SP2B of the memory 112B in step S144. In such case, the host 110B can correspondingly send an access message packet PCK4 to the memory extension device 120B in step S145, wherein the access message packet PCK4 includes the data read by the host 110B from the corresponding memory space SP2B in the memory 112B. Next, in step S146, when the memory extension device 120B receives the access message packet PCK4, the memory extension device 120B can send an access message packet PCK5 to the memory extension device 120A according to the access message packet PCK4. In step S147, when the memory extension device 120A receives the access message packet PCK5, the memory extension device 120A can send an access message packet PCK6 to the host 110A according to the access message packet PCK5, enabling the host 110A to obtain the data stored in the corresponding memory space SP2B in the memory 112B.

However, in some embodiments, the access message packet PCK3 may include data and addresses needed for a write operation, and in such case, the host 110B can perform the write operation on the memory space SP2B of the memory 112B in step S114. After writing the data, the host 110B can correspondingly generate the message packet PCK4 as a response. After the message packet PCK4 has undergone format conversion and forwarded by the memory extension devices 120B and 120A, the host 110A can receive the access message packet PCK6 in step S147, thereby confirming that the write operation is completed.

In the present embodiment, the host 110B can send the access message packet PCK4 to the memory extension device 120B according to the CXL.cache protocol in response to the access message packet PCK3 previously sent by the memory extension device 120B, and the memory extension device 120A transmits the access message packet PCK6 according to the CXL.mem protocol in response to the access message packet PCK1 sent by the host 110A. Thus, in step S147, the memory extension device 120A can perform format conversion on the access message packet PCK5 to generate the access message packet PCK6 compliant with the format specification of the CXL.mem protocol.

Figure 4:
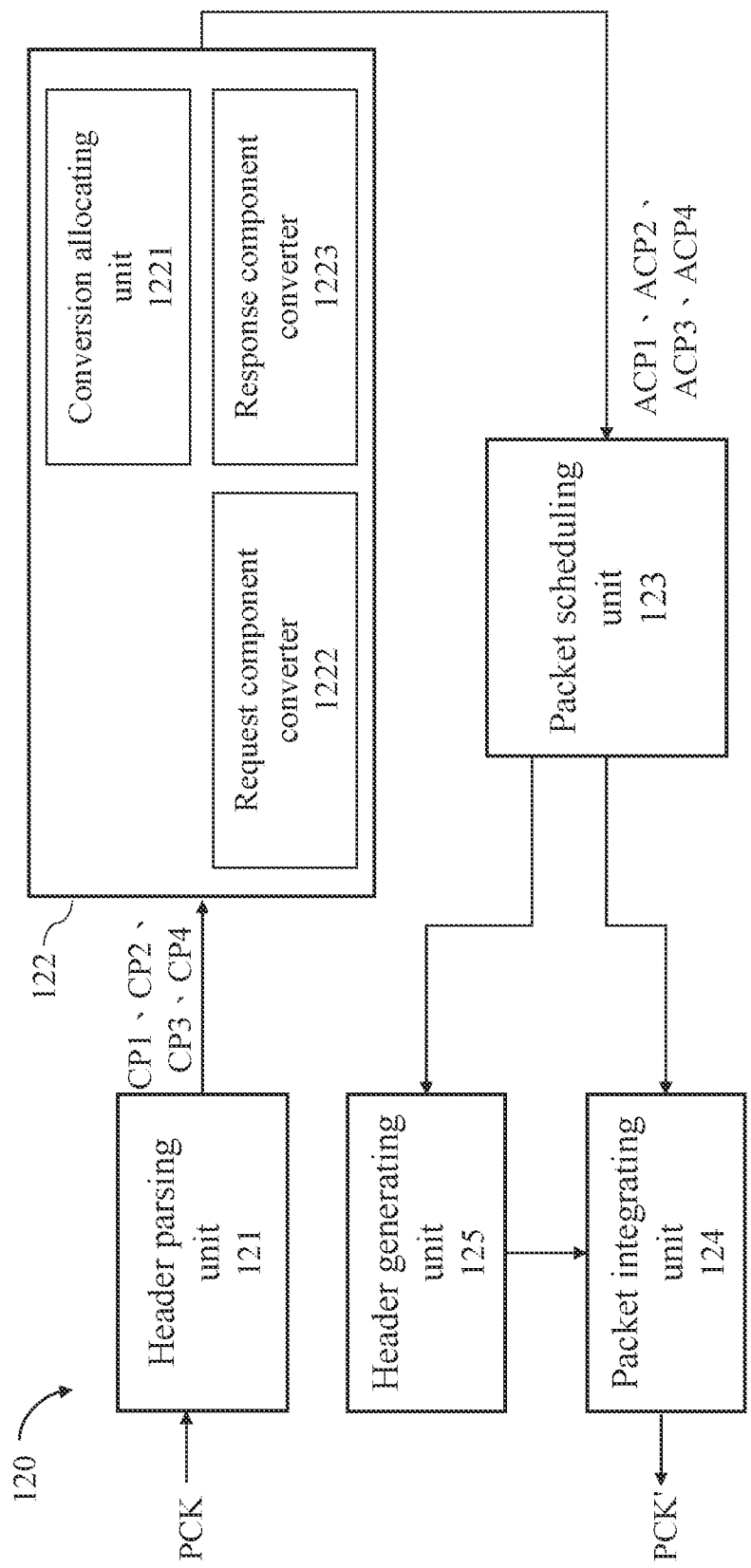
FIG. 4 is a schematic diagram of a memory extension device according to an embodiment of the present application.

FIG. 4 shows a schematic diagram of a memory extension device according to an embodiment of the present application. As shown in FIG. 4, the memory extension device 120A may include a header parsing unit 121, a packet component converting unit 122, a packet scheduling unit 123, a packet integrating unit 124 and a header generating unit 125. In the present embodiment, the header parsing unit 121 parses a header of an message packet PCK received by the memory extension device 120A. According to the CXL communication protocol, each message packet can include a header and multiple packet components, each message packet may include both packet components of the CXL.mem protocol and packet components of the CXL.cache protocol, and the header parsing unit 121 can determine the type of each packet component in the message packet PCK by means of parsing the header of the message packet PCK.

In the present embodiment, the message packet PCK may include, for example, packet components CP1, CP2, CP3 and CP4. Once the header parsing unit 121 has determined the types of the packet components CP1 to CP4 in the message packet PCK, the packet component converting unit 122 can convert the packet component that belongs to the CXL.mem protocol in the message packet PCK into a packet component of the CXL.cache protocol, and convert the packet component that belongs to the CXL.cache protocol in the message packet PCK into a packet component of the CXL.mem protocol.

Next, the packet scheduling unit 123 can select needed parts or all of the packet components generated by the packet component converting unit 122 as sendable packet components that are to be sent. For example, after the packet component converting unit 122 completes the format conversion of the packet components CP1 to CP4 and generates corresponding packet components ACP1 to ACP4, the packet scheduling unit 123 can select the packet components APC1 to APC4 altogether as sendable packet components. After the packet scheduling unit 123 selects the sendable packet components APC1 to APC4, the header generating unit 125 can generate a header of a sendable packet PCK' according to the sendable packet components APC1 to APC4, and the packet integrating unit 124 can integrate the sendable packet components ACP1 to ACP4 and the header generated by the header generating unit 125 into the sendable packet PCK'. As a result, the memory extension device 120A has completed the component format conversion in the message packet PCK, and can correspondingly send the format-converted sendable packet PCK' to the host 110A or the memory extension device 120B.

In the aforementioned embodiment, the packet scheduling unit 123 can wait till all of the packet components CP1 to CP4 have all undergone format conversion and then select all of the packet components ACP1 to ACP4 as the sendable packet components; however, the present application is not limited thereto. In some embodiments, the time needed for format conversion of different packet components may be different. Thus, in order to minimize the wait time of each packet component, each time the packet component converting unit 122 generates one packet component, the packet scheduling unit 123 may select the instant packet component as a sendable packet component. Meanwhile, the other packet components not yet having undergone format conversion can be first labeled as invalid, and a packet including the sendable packet component can be generated by the packet integrating unit 124 and the header generating unit 125, for the memory extension device 120A to send the packet component as soon as possible.

For example, the packet scheduling unit 123 can immediately select the corresponding packet component ACP1 as the sendable packet component after the packet component CP1 has undergone format conversion, and encapsulate the sendable packet component into a packet by the packet integrating unit 124 and the header generating unit 125 for sending. Similarly, once the packet components APC2, APC3 and APC4 having undergone format conversion are generated, the memory extension device 120A may sequentially generate and send the corresponding packets by the packet integrating unit 124 and the header generating unit 125. In such case, the multiple packet components originally sent over one single packet may need to be sent over multiple packets; therefore, a lower throughput of the memory extension device 120A may be resulted.

In some embodiments, to achieve the balance between throughput and transmission delay, the packet scheduling unit 123 may preferentially select one packet component as a sendable packet component only when the wait time of the packet component generated after format conversion exceeds a predetermined time. For example, after the packet component converting unit 122 generates the packet component ACP1, if the time that the packet component ACP1 needs to wait for the completion of other packets before it can be sent exceeds a predetermined time, the packet scheduling unit 123 can preferentially select the packet component ACP1 as the sendable packet component, and encapsulate the sendable packet component and the header into a packet so as to send out the packet by the packet integrating unit 124 and the header generating unit 125 as soon as possible, thereby preventing an overly long wait time of the packet component ACP1. However, if the packet components ACP2, ACP3 and ACP4 can all be generated within a time limit, the packet scheduling unit 123 may wait until all the packet components ACP1 to ACP4 are generated and then encapsulate the packet components ACP1 to ACP4 altogether, thereby enhancing the throughput of the memory extension device 120A. That is to say, according to system requirements, a designer can correspondingly configure a mechanism for the packet scheduling unit 123 to select sendable packet components, thereby satisfying requirements of the system with respect to the wait time and/or throughput.

Moreover, packet components of the CXL.mem protocol can be divided into request packet components sent by an initiating requesting party and response packet components sent by a receiving requesting party, and packet components of the CXL.cache protocol can also be divided into request packet components and response packet components. The two protocols have different format specifications for request packet components and response packet components. Thus, as shown in FIG. 4, the packet component converting unit 122 may include a conversion allocating unit 1221, a request component converter 1222 and a response component converter 1223; that is, the packet component converting unit 122 can perform format conversion by using the request component converter 1222 and the response component converter 1223 respectively in different cases.

For example, the conversion allocating unit 1221 can send each packet component to the request component converting unit 1222 or the response component converting unit 1223 according to the type of each packet component. The request component converter 1222 can convert a request packet component that belongs to the CXL.mem protocol into a request packet component of the CXL.cache protocol, and convert a request packet component that belongs to the CXL.cache protocol into a request packet component of the CXL.mem protocol. The response component converter 1223 can convert a response packet component that belongs to the CXL.mem protocol into a response packet component of the CXL.cache protocol, and convert a response packet component that belongs to the CXL.cache protocol into a response packet component of the CXL.mem protocol.

Figure 5:
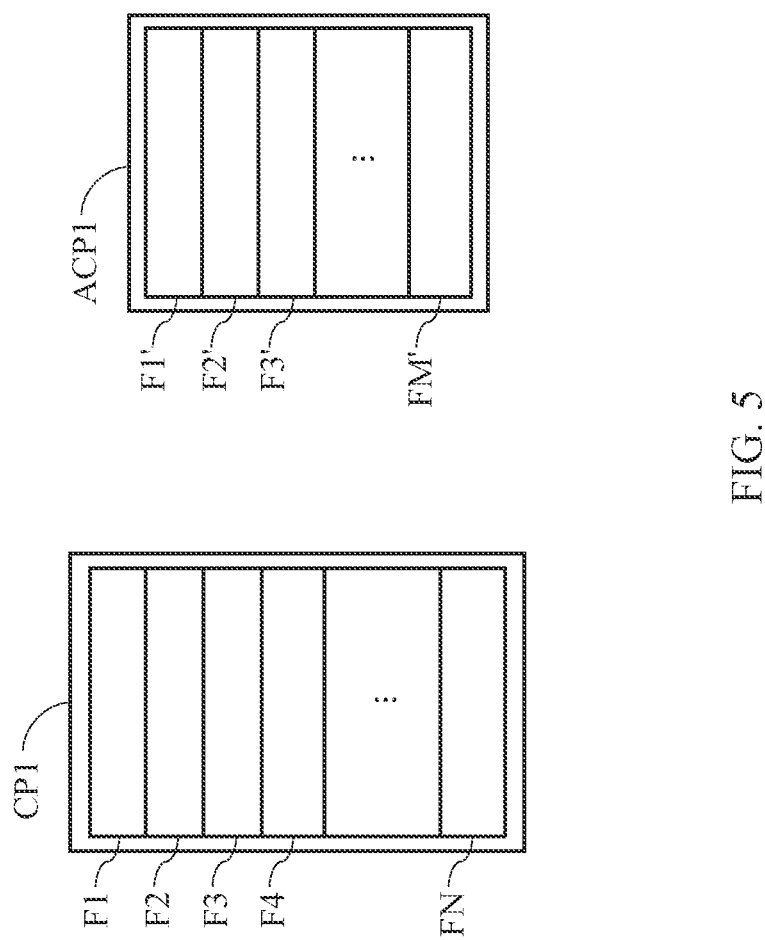
FIG. 5 is a schematic diagram of a packet component and a packet component generated after format conversion according to an embodiment of the present application.

FIG. 5 shows a schematic diagram of the packet component CP1 and the packet component ACP1 generated after format conversion according to an embodiment of the present application. In the present embodiment, the packet component CP1 can be, for example, a request packet component of the CXL.mem protocol. In such case, the request component converting unit 1222 can convert the packet component CP1 into the request packet component ACP1 of the CXL.cache protocol.

According to the specification of the CXL.mem protocol, the packet component CP1 can include multiple fields F1, F2, . . . and FN, where N is an integer greater than 1, and the individual fields may be used for recording different types of information, respectively. For example, the field F1 can be used to indicate whether the packet component CP1 is valid, the field F2 can be used to store an address, and the field F3 can be used to store a cache tag. Similarly, according to the specification of the CXL.cache protocol, the packet component ACP1 can include multiple fields F1', F2', . . . and FM', where M is an integer greater than 1. Because content requirements for packet components of the CXL.mem protocol and the CXL.cache protocol are different, and the receiving parties of the packet components CP1 and ACP1 are also different, the fields F1 to FN of the packet component CP1 may be different from the fields F1' to FM' of the packet component ACP1.

For example, the packet component CP1 and the packet component ACP1 may include fields for storing the same type of information; however, the protocols of the two and the receiving parties of the two are different. Thus, the request component converting unit 1222 needs to adjust the content in a predetermined field of the packet component CP1 to generate the content of the corresponding field in the packet component ACP1. For example, assume that an address recorded in an address field of the packet component CP1 is, for example, a physical address recorded in the host 110A. In such case, the request component converting unit 1222 may need to obtain a virtual address of the memory extension device 120B or a physical address of the host 110B corresponding to the physical address by means of a look-up table (LUT), and store the address obtained into an address field of the packet component ACP1, so that the host 110B would be able to identify and access the address upon receiving the packet component ACP1.

Moreover, some fields in the packet component CP1 are not necessary in the packet component ACP1, and these unnecessary fields may be temporarily stored in the packet component converting unit 122 according to requirements or be directly deleted. In addition, some fields needed by the packet component ACP1 do not exist in the packet component CP1. In such case, the request component converting unit 1222 may need to establish the field needed by the packet component ACP1 according to the content of the packet component CP1 and/or information related to a receiving party of the packet component ACP1.

In some embodiments, the memory extension device 120B can have a structure similar to that of the memory extension device 120A, and perform packet format conversion according to the method aforementioned. In the embodiment shown in FIG. 2, the computing system 100 can perform format conversion on the access message packet PCK2 by using the memory extension device 120B to generate the access message packet PCK3 compliant with the specification of the CXL.cache protocol in step S143, and can perform format conversion on the access message packet PCK5 by using the memory extension device 120A to generate the access message packet PCK6 compliant with the specification of the CXL.mem protocol in step S147; however, the present application is not limited thereto. In some embodiments, the computing system 100 can perform format conversion on the access message packet PCK1 by using the memory extension device 120A to generate the access message packet PCK2 compliant with the specification of the CXL.cache protocol in step S142, and/or can perform format conversion on the access message packet PCK4 by using the memory extension device 120B to generate the access message packet PCK5 compliant with the specification of the CXL.mem protocol in step S146.

That is to say, the present application does not limit that format conversion of any specific type is necessarily performed by the memory extension device 120A or the memory extension device 120B. In some embodiments, the memory extension device 120A and the memory extension device 120B can both include the request component converting unit 1222 and the response component converting unit 1223 that convert packets of the CXL.mem protocol into packets of the CXL.cache protocol and convert packets of the CXL.cache protocol into packets of the CXL.mem protocol, thereby enhancing the efficiency of packet format conversion performed by the computing system 100.

Figure 6:
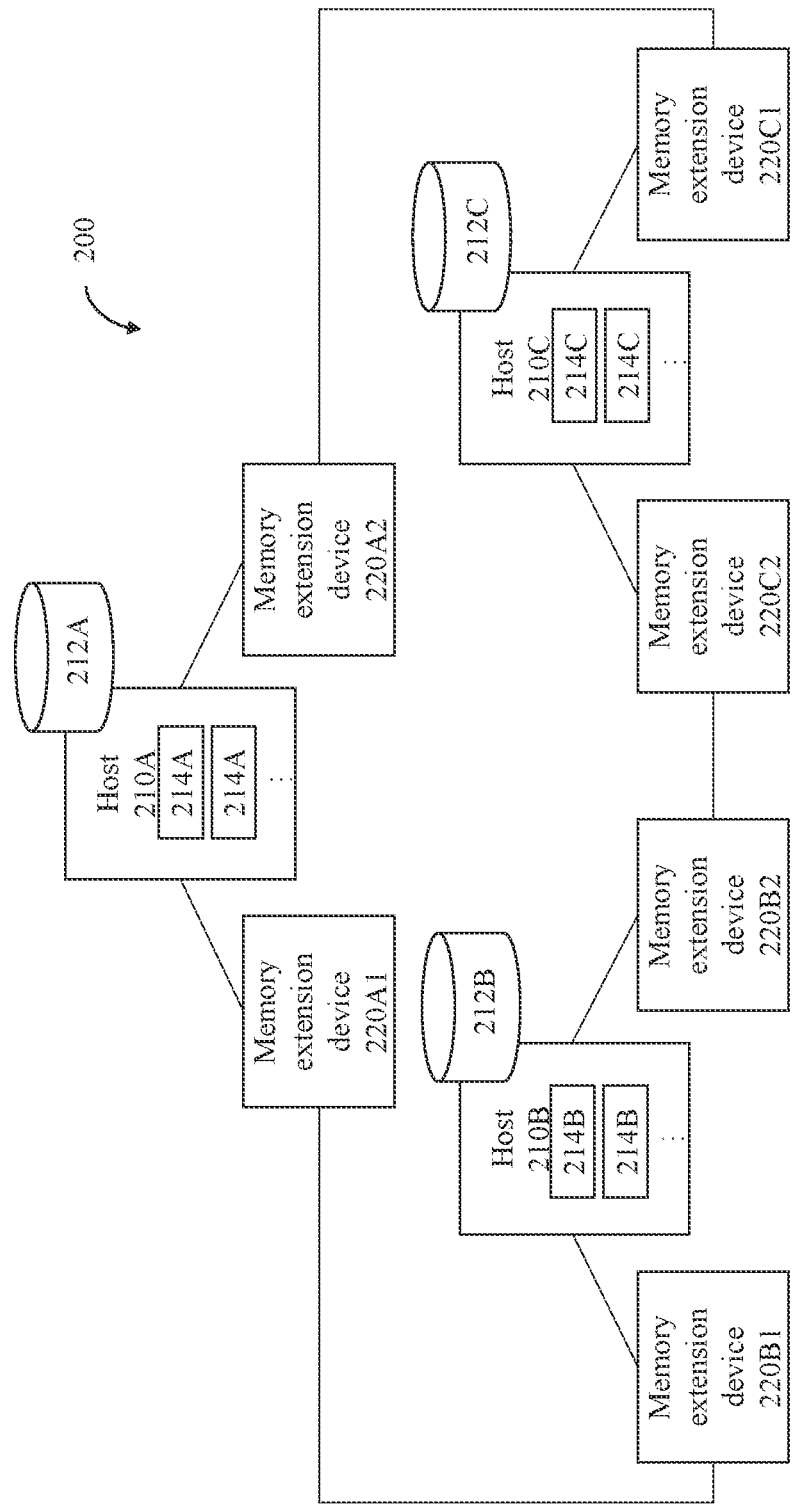
FIG. 6 is a schematic diagram of a computing system according to another embodiment of the present application.

Moreover, in some embodiments, the computing system 100 may further include more hosts and memory extension devices. FIG. 6 shows a schematic diagram of a computing system according to another embodiment of the present application. As shown in FIG. 6, a computing system 200 may include hosts 210A, 210B and 210C, and memory extension devices 220A1, 220A2, 220B1, 220B2, 220C1 and 220C2. The computing system 200 has a structure similar to that of the computing system 100, and is operable according to the similar principles. For example, the host 210A may include a memory 212A and multiple processing units 214A, the host 210B may include a memory 212B and multiple processing units 214B, and the host 210C may include a memory 212C and multiple processing units 214C. The hosts 210A, 210B, and 210C may be multi-core servers, wherein the processing units 214A, 214B, and 214C therein may be computing cores for executing various software programs. Moreover, in the present embodiment, the host 210A may be coupled to the memory extension devices 220A1 and 220A2, the host 210B may be coupled to the memory extension devices 220B1 and 220B2, and the host 210C may be coupled to the memory extension devices 220C1 and 220C2. In addition, the memory extension device 220A1 may be coupled to the memory extension device 220B1, the memory extension device 220A2 may be coupled to the memory extension device 220C1, and the memory extension device 220B2 may be coupled to the memory extension device 220C2.

In such case, the computing system 200 allows the hosts 210A, 210B and 210C to access a memory of another host through the corresponding memory extension devices. For example, the computing system 200 enables a predetermined memory address segment of the host 210C to correspond to multiple memory spaces of the memory 212C, and a predetermined memory address segment of the host 210B to correspond to multiple idle memory spaces of the memory 212C. As such, the host 210C is able to access the multiple memory spaces of the memory 212C according to the corresponding memory address segment, and the host 210B is also able to access the multiple idle memory spaces of the memory 212C through the memory extension device 220B2 and the memory extension device 220C2 according to the corresponding memory address segment. Thus, the processing unit 214B in the host 210B and the idle memory space of the memory 212C can be jointly configured into a virtual machine. Similarly, the host 210A is also able to access the multiple idle memory spaces of the memory 212C through the memory extension device 220A2 and the memory extension device 220C1 according to the corresponding memory address segment, and the host 210C is also able to access the memory 212A in the host 210A through the memory extension device 220C1 and the memory extension device 220A2 and access the memory 212B in the host 210B through the memory extension device 220C2 and the memory extension device 220B2.

In some other embodiments, a designer can add more hosts into a computing system according to the structures of the computing systems 100 and 200 in FIG. 1 and FIG. 3, and the individual hosts can be coupled through memory extension devices, so that each host is able to access the memory of another host through the corresponding memory extension devices. Consequently, the computing system is capable of more flexibly configuring hardware resources to establish a virtual machine as well as improving the hardware utilization rate of the computing system.

Figure 7:
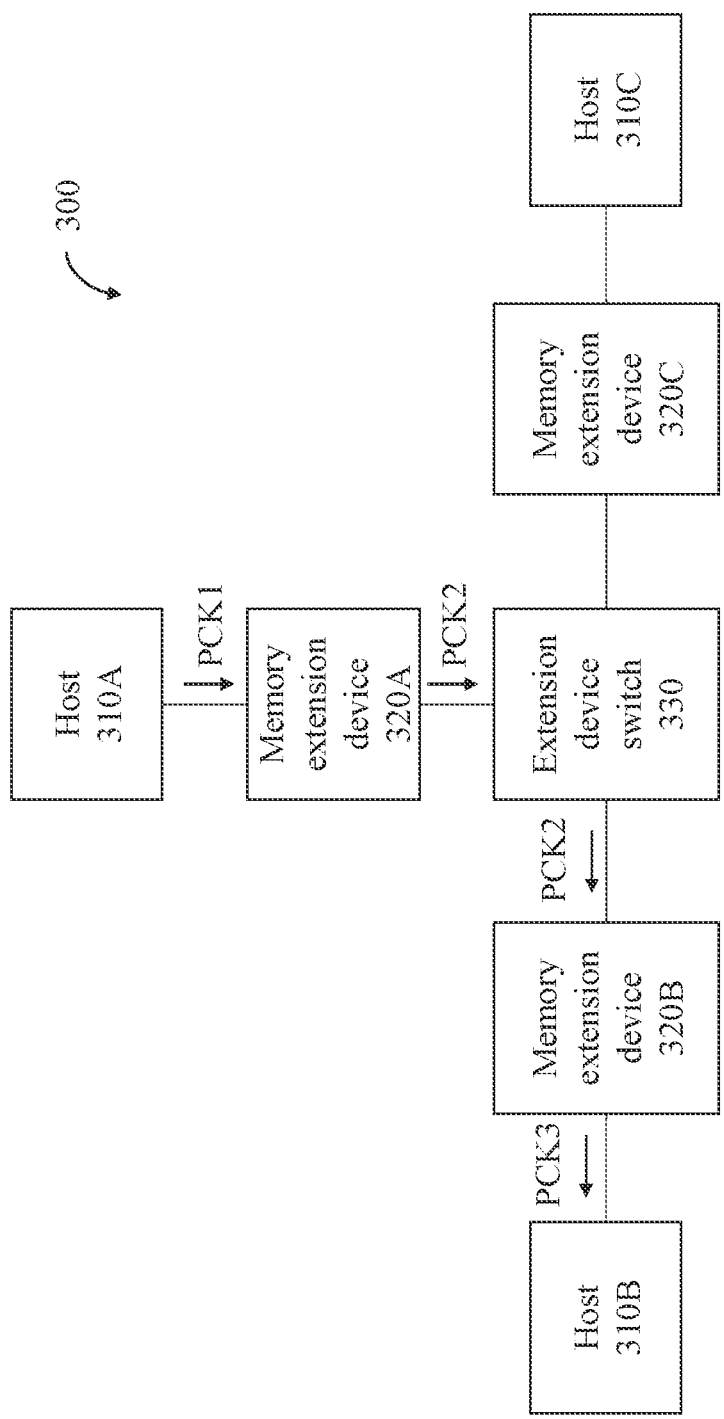
FIG. 7 is a schematic diagram of a computing system according to yet another embodiment of the present application.

FIG. 7 shows a schematic diagram of a computing system according to another embodiment of the present application. As shown in FIG. 7, a computing system 300 may include hosts 310A, 310B and 310C, memory extension devices 320A, 320B and 320C, and an extension device switch 330. The computing system 300 is operable according to principles similar to those of the computing system 200. Differences between the computing system 300 and the computing system 200 are that, the computing system 300 may adopt the extension device switch 330 for the connection among the memory extension devices 320A, 320B and 320C, and the extension device switch 330 is configured to forward message packets received from the memory extension devices 320A, 320B and 320C to the corresponding memory extension devices. As such, each host is able to access the memory of another host through the corresponding memory extension device and the extension device switch 330. Moreover, compared to the computing system 200, the computing system 300 may include a smaller number of memory extension devices, thereby reducing hardware needed by the computing system 300.

For example, when the host 310A intends to access the memory of the host 310B, the host 310A can send the access message packet PCK1 to the memory extension device 320A, and the memory extension device 320A can send the access message packet PCK2 to the extension device switch 330 according to the access message packet PCK1. Upon receiving the access message packet PCK2 generated by the memory extension device 320A, the extension device switch 330 forwards the access message packet PCK2 to the memory extension device 310B, and the memory extension device 310B then generates the access message packet PCK3 to the host 310B according to the access message packet PCK2, for the host 310B to correspondingly perform a read or write operation.

In some embodiments, a header of an access message packet can store information related to a receiving party of the access message packet. Thus, by parsing the header of the access message packet PCK2, the extension device switch 330 can learn whether to forward the access message packet PCK2 to the host 310B or 310C; however, the present application is not limited to the above examples. In some embodiments, while transmitting a message packet to the extension device switch 330, the memory extension devices 320A, 320B and 320C can additionally transmit a signal to notify the extension device switch 330 of the transmission target of the message packet.

In summary, the computing systems and the associated methods of the present application allow multiple hosts to be coupled to one another through memory extension devices, so that each host is able to access the memory of another host through corresponding memory extension devices. As a result, the computing system of the present application is capable of more flexibly configuring hardware resources to establish a virtual machine as well as improving the hardware utilization rate of the computing system.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A computing system, comprising:
    a first host, comprising a first memory, the first host having a plurality of first memory addresses corresponding to a plurality of memory spaces of the first memory, and a plurality of second memory addresses;
    a second host, comprising a second memory, wherein the plurality of second memory addresses of the first host correspond to a plurality of memory spaces of the second memory;
    a first memory extension device, coupled to the first host; and
    a second memory extension device, coupled to the second host and the first memory extension device;
    wherein, the first host is configured to access the plurality of memory spaces of the second memory through the first memory extension device and the second memory extension device;
    wherein the first host and the first memory extension device perform message transmission via a consistent interconnection protocol, the second host and the second memory extension device perform message transmission via the consistent interconnection protocol, and the consistent interconnection protocol comprises a first sub-protocol used when a host initiates a read/write operation to an external memory and a second sub-protocol used when the external memory initiates a read/write operation to a host memory.

2. The computing system according to claim 1, wherein the first memory extension device is configured to send, upon receiving a first access message packet sent by the first host, a second access message packet to the second memory extension device according to the first access message packet; and the second memory extension device is configured to send, upon receiving the second access message packet, a third access message packet to the second host according to the second access message packet so as to access at least one corresponding memory space among the plurality of memory spaces of the second memory.

3. The computing system according to claim 2, wherein the first host sends the first access message packet according to the first sub-protocol, and the second memory extension device sends the third access message packet according to the second sub-protocol.

4. The computing system according to claim 3, wherein the first memory extension device is further configured to perform format conversion on the first access message packet to generate the second access message packet compliant with a specification of the second sub-protocol; or the second memory extension device is further configured to perform format conversion on the second access message packet to generate the third access message packet compliant with a specification of the second sub-protocol.

5. The computing system according to claim 2, wherein the second host is configured to write data to at least one corresponding memory space in the second memory or read data from the at least one corresponding memory space in the second memory according to the third access message packet, generate a fourth access message packet, and transmit the fourth access message packet to the second memory extension device; the second memory extension device is further configured to send a fifth access message packet to the first memory extension device according to the fourth access message packet; and the first memory extension device is further configured to send a sixth access message packet to the first host according to the fifth access message packet, so as to complete an access operation performed by the first host on the at least one corresponding memory space of the second memory.

6. The computing system according to claim 5, wherein the second host transmits the fourth access message packet according to the second sub-protocol, and the first memory extension device transmits the sixth access message packet according to the first sub-protocol.

7. The computing system according to claim 6, wherein the first memory extension device is further configured to perform format conversion on the fifth access message packet to generate the sixth access message packet compliant with a specification of the first sub-protocol; or the second memory extension device is further configured to perform format conversion on the fourth access message packet to generate the fifth access message packet compliant with a specification of the first sub-protocol.

8. The computing system according to claim 1, wherein the first memory extension device comprises:
 a header parsing unit, configured to parse a header of a message packet received by the first memory extension device to determine a type of each packet component in the message packet;
 a packet component converting unit, configured to convert a packet component that belongs to the first sub-protocol in the message packet into a packet component of the second sub-protocol, and/or convert the packet component of the second sub-protocol in the message packet into the packet component of the first sub-protocol;
 a packet scheduling unit, configured to select at least one packet component generated by the packet component converting unit as at least one sendable packet component;
 a header generating unit, configured to generate a header of a sendable packet according to the at least one sendable packet component; and
 a packet integrating unit, configured to integrate the at least one sendable packet component and the header of the sendable packet into the sendable packet.

9. The computing system according to claim 8, wherein:
 the packet scheduling unit selects, each time the packet component converting unit generates a packet component, the said packet component as a sendable packet component;
 the packet scheduling unit selects, after the packet component converting unit completes format conversion for each packet component in the message packet and generates a plurality of converted packet components, all of the plurality of converted packet components as the sendable packet component; or
 the packet scheduling unit selects, when a wait time of at least one packet component generated by the packet component converting unit exceeds a predetermined time, the said at least one packet component as the sendable packet component.

10. The computing system according to claim 8, wherein the packet component converting unit comprises:
 a request component converter, configured to convert a request packet component of the first sub-protocol into a request packet component of the second sub-protocol, and/or convert a request packet component of second sub-protocol into a request packet component of the first sub-protocol;
 a response component converter, configured to convert a response packet component of the first sub-protocol into a response packet component of the second sub-protocol, and/or convert a response packet component of the second sub-protocol into a response packet component of the first sub-protocol; and
 a conversion allocating unit, configured to send each packet component to the request component converting unit or the response component converting unit according to the type of each packet component.

11. The computing system according to claim 1, wherein the first host and the first memory extension device are coupled to each other through a PCIe interface member, and the consistent interconnection protocol is a CXL communication protocol.

12. The computing system according to claim 1, wherein the second host is configured to access an idle memory space of the first memory through the second memory extension device and the first memory extension device.

13. The computing system according to claim 1, further comprising:
 an extension device switch, coupled to the first memory extension device and the second memory extension device;
 a third host, comprising a third memory; and
 a third memory extension device, coupled to the third host and the extension device switch;
 wherein, the first host is further configured to access a first idle memory space of the third memory through the first memory extension device, the extension device switch and the third memory extension device; the second host is further configured to access a second idle memory space of the third memory through the second memory extension device, the extension device switch and the third memory extension device; and the third host is configured to access an idle memory space of the first memory through the third memory extension device, the extension device switch and the first memory extension device, and access an idle memory space of the second memory through the third memory extension device, the extension device switch and the second memory extension device.

14. A method for a computing system, the computing system comprising a first host, a second host, a first memory extension device and a second memory extension device, the first host comprising a first memory, the second host comprising a second memory, the first memory extension device coupled to the first host, the second memory extension device coupled to the second host and the first memory extension device; the method comprising:
- having a plurality of first memory addresses of the first host correspond to a plurality of memory spaces of the first memory;
- having a plurality of second memory addresses of the first host correspond to a plurality of memory spaces of the second memory; and
- accessing, by the first host, the plurality of memory spaces of the second memory through the first memory extension device and the second memory extension device;

wherein the first host and the first memory extension device perform message transmission via a consistent interconnection protocol, the second host and the second memory extension device perform message transmission via the consistent interconnection protocol, and the consistent interconnection protocol comprises a first sub-protocol used when a host initiates a read/write operation to an external memory and a second sub-protocol used when the external memory initiates a read/write operation to a host memory.

15. The method according to claim 14, wherein the step of accessing, by the first host, the plurality of memory spaces of the second memory through the first memory extension device and the second memory extension device comprises:
- having the first host send a first access message packet to the first memory extension device;
- when the first memory extension device receives the first access message packet, having the first memory extension device send a second access message packet to the second memory extension device according to the first access message packet; and
- when the second memory extension device receives the second access message packet, having the second memory extension device send a third access message packet to the second host according to the second access message packet.

16. The method according to claim 15, wherein the first host sends the first access message packet according to the first sub-protocol, and the second memory extension device sends the third access message packet according to the second sub-protocol.

17. The method according to claim 16, wherein:
the step of sending the second access message packet to the second memory extension device according to the first access message packet comprises performing format conversion on the first access message packet by the first memory extension device to generate the second access message packet compliant with a specification of the second sub-protocol; or the step of sending the third access message packet to the second host according to the second access message packet comprises performing format conversion on the second access message packet by the second memory extension device to generate the third access message packet compliant with a specification of the second sub-protocol.

18. The method according to claim 14, further comprising:
having the second host access an idle memory space of the first memory through the second memory extension device and the first memory extension device.

19. A computing system, comprising:
a first host, comprising a first memory, the first host having a plurality of first memory addresses corresponding to a plurality of memory spaces of the first memory, and a plurality of second memory addresses;
a second host, comprising a second memory, wherein the plurality of second memory addresses of the first host correspond to a plurality of memory spaces of the second memory;
a first memory extension device, coupled to the first host; and
a second memory extension device, coupled to the second host and the first memory extension device;
wherein, the first host is configured to access the plurality of memory spaces of the second memory through the first memory extension device and the second memory extension device; and
wherein the first memory extension device is configured to send, upon receiving a first access message packet sent by the first host, a second access message packet to the second memory extension device according to the first access message packet; and the second memory extension device is configured to send, upon receiving the second access message packet, a third access message packet to the second host according to the second access message packet so as to access at least one corresponding memory space among the plurality of memory spaces of the second memory.

* * * * *